(12) United States Patent
Clamen et al.

(10) Patent No.: US 8,329,798 B2
(45) Date of Patent: *Dec. 11, 2012

(54) CURABLE COMPOSITION

(75) Inventors: Guy Joseph Germaine Clamen, Opio (FR); Nolwenn Colmou, Nice (FR)

(73) Assignee: Rohm and Haas Company, Philadelphia, PA (US)

( * ) Notice: Subject to any disclaimer, the term of this patent is extended or adjusted under 35 U.S.C. 154(b) by 682 days.

This patent is subject to a terminal disclaimer.

(21) Appl. No.: 11/986,203

(22) Filed: Nov. 20, 2007

(65) Prior Publication Data

US 2008/0154013 A1 Jun. 26, 2008

(30) Foreign Application Priority Data

Dec. 22, 2006 (EP) .................................... 06292046

(51) Int. Cl.
*C08K 5/05* (2006.01)

(52) U.S. Cl. ...................... 524/388; 427/385.5; 428/500; 524/56; 524/58; 524/376; 524/377; 524/378; 524/386; 524/387; 524/389

(58) Field of Classification Search ................ 524/56, 524/58, 376, 377, 378, 386, 387, 388, 389; 427/385.5; 428/500

See application file for complete search history.

(56) References Cited

U.S. PATENT DOCUMENTS

| | | | |
|---|---|---|---|
| 4,384,056 A | 5/1983 | Schmidt et al. | |
| 4,539,361 A | 9/1985 | Siol et al. | |
| 5,077,361 A | 12/1991 | Hughes et al. | |
| 5,294,686 A | 3/1994 | Fiarman et al. | |
| 5,521,266 A | 5/1996 | Lau | |
| 5,661,213 A | 8/1997 | Arkens et al. | |
| 5,977,232 A | 11/1999 | Arkens et al. | |
| 6,136,916 A | 10/2000 | Arkens et al. | |
| 6,730,729 B2 * | 5/2004 | Gerst et al. | 524/460 |
| 7,323,242 B2 * | 1/2008 | Gerst et al. | 428/297.4 |
| 2001/0031826 A1 | 10/2001 | Laubender et al. | |
| 2003/0114562 A1 * | 6/2003 | Sitabkhan et al. | 524/261 |
| 2003/0149119 A1 | 8/2003 | Schultz | |
| 2005/0048212 A1 | 3/2005 | Clamen et al. | |
| 2005/0202224 A1 | 9/2005 | Helbing | |
| 2007/0006390 A1 * | 1/2007 | Clamen et al. | 8/115.51 |
| 2008/0009209 A1 * | 1/2008 | Clamen et al. | 442/59 |
| 2009/0252962 A1 * | 10/2009 | Michl et al. | 428/375 |

FOREIGN PATENT DOCUMENTS

| | | | |
|---|---|---|---|
| EP | 1760125 A2 * | 3/2007 | |
| JP | 07242853 A * | 9/1995 | |
| WO | WO 2006063802 A2 * | 6/2006 | |

* cited by examiner

*Primary Examiner* — David W Wu
*Assistant Examiner* — Marie Reddick
(74) *Attorney, Agent, or Firm* — Andrew E. C. Merriam

(57) ABSTRACT

A curable composition, useful as a thermosetting binder, having a polycarboxy polymer or co-polymer and a multifunctional polyol.

7 Claims, 1 Drawing Sheet

CURABLE COMPOSITION

CROSS REFERENCE TO RELATED PATENT APPLICATIONS

This is a non-provisional patent application of European patent application No. 06292046.7 filed Dec. 22, 2006.

This invention relates to a formaldehyde-free curable aqueous composition and its use as a binder for heat-resistant nonwovens.

Nonwoven fabrics are composed of fibers which may be consolidated by purely mechanical means such as, for example, by entanglement caused by needle-punching, by an air-laid process, and by a wet-laid process; by chemical means such as, for example, treatment with a polymeric binder; or by a combination of mechanical and chemical means before, during, or after nonwoven fabric formation. Binders for non-woven materials have mostly contained resins, such as formaldehyde condensate resins that include urea-formaldehyde (UF), phenol-formaldehyde (PF), and melamine-formaldehyde (MF). However, formaldehyde is a known carcinogen, so users of formaldehyde containing resins are looking for less harmful alternatives. Further, such resins tend to yellow when submitted to high temperatures.

Some nonwoven fabrics are used at temperatures substantially higher than ambient temperature such as, for example, glass fiber-containing nonwoven fabrics which are impregnated with a hot asphaltic composition pursuant to making roofing shingles or roll roofing material. When a nonwoven fabric is contacted with a hot asphaltic composition at temperatures of 150-250° C. the nonwoven fabric may sag, shrink, or otherwise become distorted. Therefore, nonwoven fabrics which incorporate a curable aqueous composition should substantially retain the properties contributed by the cured aqueous composition such as, for example, dimensional stability. In addition, the cured composition should not substantially detract from essential nonwoven fabric characteristics, as would be the case, for example, if the cured composition were too rigid or brittle or became sticky under processing conditions.

Curable compositions containing little or no formaldehyde are highly desirable in a variety of products, due to the health and environmental problems associated with formaldehyde. Existing commercial formaldehyde-free binders contain a carboxylic acid polymer and a polyol that esterify and form a thermoset when heat cured, as described, for example, in U.S. Pat. No. 5,661,213. However, the systems based on amine-containing polyols deliver high wet strength properties but are susceptible to undesirable high temperature discoloration. On the other hand, systems based on known amine-free polyols, such as glycerol, show better high temperature color stability properties but poor wet strength properties. Thus, there is a need for new formaldehyde-free binders for making a heat-resistant nonwoven fabric with improved wet strength and a reduced tendency to discolor.

This invention is a curable aqueous composition comprising (a) at least one polycarboxy (co)polymer comprising at least two carboxylic acid groups, anhydride groups, or salts thereof prepared by solution or emulsion polymerization; (b) at least one polyol of the formula

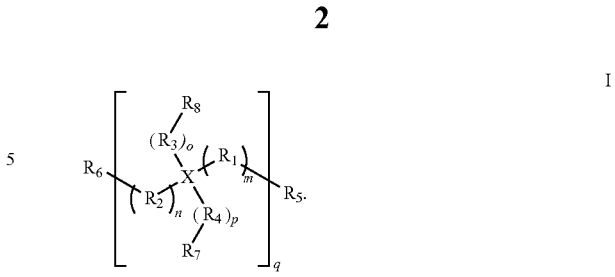

where X is selected from the group consisting of O and C; and
when X is O:
o and p are each 0, and $R_7$ and $R_8$ do not exist;
$R_1$ and $R_2$ are independently in each instance selected from the group consisting of alkyl, alkylene, oxyalkylene and hydroxyalkyl;
$R_5$ and $R_6$ are independently in each instance selected from the group consisting of H, hydroxy, alkyl, alkoxy and hydroxyalkyl;
and m, n, and q are integers selected independently from 1 to 5;
such that the total number of hydroxyl groups is between 4 and 8;
when X is C:
m, n, o, and p are integers selected independently from 1 to 16;
$R_1$, $R_2$, $R_3$ and $R_4$ are independently in each instance selected from the group consisting of Alkylene, oxyalkylene and alkoxy;
$R_5$, $R_6$, $R_7$ and $R_8$ are independently in each instance selected from the group consisting of H, alkyl, hydroxyalkyl and hydroxy;
and q=1;
such that the total number of hydroxyl groups is between 4 and 8;
and wherein in each case of X is either O or C the ratio of the number of equivalents of said carboxylic acid groups, anhydride groups, or salts thereof to the number of equivalents of said hydroxyl groups is from 1/0.01 to 1/3.

Preferably, the ratio of equivalents of the carboxy groups in the polycarboxy polymer or copolymer to the hydroxy groups in the polyol is from 1/0.02 to 1/2, more preferably from 1/0.1 to 1/1.5, still more preferably from 1/0.1 to 1/0.8.

By "independently in each instance selected from" we mean to include the fact that, for example, when m is greater than one, the several $R_1$ groups involved can be the same or different and selected in each instance from the substituents described above. Thus, in each instance where there might be a multiple of each of $R_1$, $R_2$ (etc), in each selection of each one of the multiple, the selection can be different or the same.

The composition provides a formaldehyde-free binder useful for making heat resistant nonwovens with reduced water sensitivity, as shown by an improved wet strength, and with a reduced tendency to discolor compared to compositions utilizing amine-containing polyols.

This invention also is a method for treating substrates with such a composition, which includes forming a curable aqueous composition comprising admixing the components of the invention with water or one or more aqueous solvent, contacting said substrate with the curable aqueous composition or, alternatively, applying the curable aqueous composition to the substrate; and heating the curable aqueous composition at a temperature of from 100° C. to 400° C. The invention also provides a fibrous article, non-woven article or composite prepared by the method for treating substrates with the composition, as described above.

Preferably, the polycarboxy (co)polymer (a) of the curable aqueous composition is an addition polymer or copolymer comprising at least one copolymerized ethylenically unsaturated carboxylic acid-containing monomer.

Preferably, the polyol (b) of the curable aqueous composition is selected from the group consisting of diglycerol, triglycerol, tetraglycerol, pentaglycerol, hexaglycerol, dipentaerythritol, ditrimethylolpropane, 1 to 15-propoxylated pentaerythritol, 1 to 15-ethoxylated pentaerythritol, 1 to 15-propoxylated ditrimethylolpropane, 1 to 15-ethoxylated ditrimethylolpropane, 1-15-ethoxylated dipentaerythritol, 1-15-propoxylated dipentaerythritol, and mixtures thereof.

In one embodiment, the curable aqueous composition further comprises one or more polyols selected from the group consisting of glycerol, ethyleneglycol, diethyleneglycol, triethyleneglycol, hexanediol, trimethylolpropane, sorbitol, sucrose, and glucose.

In another embodiment, the curable aqueous composition further comprises a phosphorous-containing accelerator such as those disclosed in U.S. Pat. No. 5,661,213.

In yet another embodiment, the polycarboxy (co)polymer (a) of the curable aqueous composition comprises an emulsion copolymer.

Figure 1:
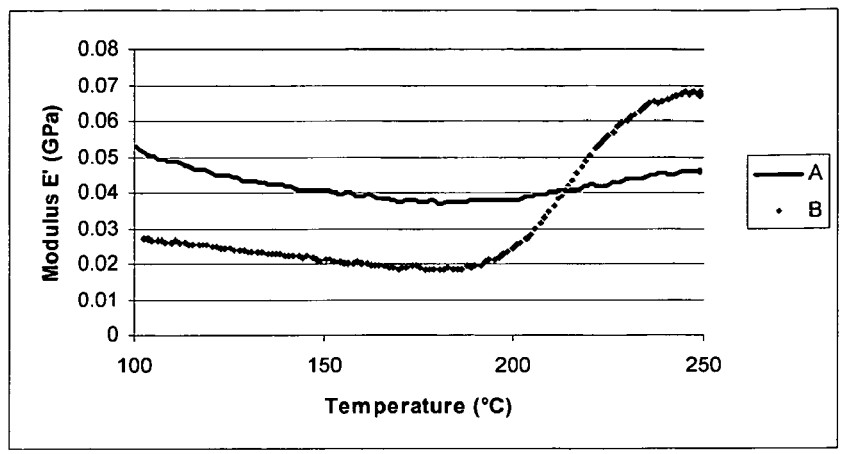
FIG. 1 depicts the Dynamic Mechanical Analysis (DMA) Modulus E', in GPa, vs. Temperature (° C.) for one embodiment of the present invention (Example 1B in curve B) and for a comparative embodiment (Comparative Example 1B in curve A).

When we refer to "(co)polymer" we refer to either a homopolymer or copolymer, or both of them in combination. We use the term "(meth)acrylate" to refer to either acrylate or methacrylate and the term "(meth)acrylic" refers to either acrylic or methacrylic.

As used herein, the term "polycarboxy (co)polymer" is an oligomer, co-oligomer, polymer or copolymer with at least two carboxylic acid functional groups, anhydride groups, or salts thereof.

As used herein, the term "hydroxyalkyl" may refer to one, or more than one, hydroxyl group attached to an alkyl group, which may or may not be branched.

As used herein, the term "oxyalkylene" refers to units having the structure: —(O-A)-, where O-A represents the monomeric residual of the polymerization reaction product of alkylene oxides, as well as the 1-carbon homolog oxymethylene, —(OCH$_2$)—. Examples of oxyalkylenes include, but are not limited to: oxyethylene with the structure —(OCH$_2$CH$_2$)—; and oxypropylene with the structure —(OC$_3$H$_6$)—.

Referring to Formula I: R$_1$ (and R$_2$, R$_3$ and R$_4$) can be branched units, and can be connected to other R$_1$ (and R$_2$, R$_3$ and R$_4$, respectively) units, terminating in one or more R$_5$ (and R$_6$, R$_8$ and R$_7$, respectively) units.

"Glass transition temperature" or "T$_g$" is the glass transition temperature, of a copolymer calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, w$_1$ and w$_2$ refer to the weight fraction of the two comonomers, based on weight of monomers charged to the reaction vessel, and T$_{g(1)}$ and T$_{g(2)}$ refer to the glass transition temperatures of the two corresponding homopolymers in degrees Kelvin. For polymers containing three or more monomers, additional terms are added (w$_n$/T$_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the Tg of a particular homopolymer, in which case the Tg of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The Fox calculation of the T$_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form.

The preferred polyols (b) are polyglycerols with an —OH functionality between 4 and 8. Specifically, these are diglycerol (functionality 4), triglycerol (functionality 5), tetraglycerol (functionality 6), pentaglycerol (functionality 7), hexaglycerol (functionality 8), and mixtures thereof. The triglycerol is particularly preferred. However, other amine-free polyols (b) can be used. Amine-containing polyols, such as triethanolamine (TEOA), are less desirable in this application because they suffer from discoloration when submitted to high temperatures. The polyol preferably should be sufficiently nonvolatile that it will substantially remain available for reaction with the polycarboxy (co)polymer in the composition during heating and curing operations. Other polyols (b) include compounds with a molecular weight less than about 10,000 bearing at least four hydroxyl groups such as, for example, ditrimethylolpropane, ethoxylated (or propoxylated) pentaerythritols, and ethoxylated (or propoxylated) dipentaerythritols, etc. Ethoxylated (EO) or propoxylated (PO) pentaerythritol (shown below), may have multiple oxyalkylene groups (oxyethylene or oxypropylene units, respectively) as R$_9$ groups (w, x, y, and z can be integers, for example 1-15; and w, x, y, and z are not necessarily the same):

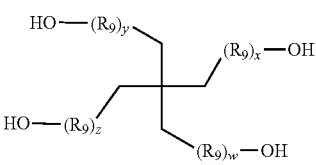

Also, one skilled in the art could envisage such polyols with mixed oxyalkylene groups. Thus, some $R_9$ units could be oxyethylene units, while others could be oxypropylene units, either located in separate $R_9$ chains, or within the same $R_9$ chain. Also envisaged are cases for which one or more of w, x, y and z are greater than 15. Similar considerations are applicable to the other ethoxylated or propoxylated polyols described above.

Although less preferred, other oligo-glycerols and polyglycerols can function adequately. Preferably, the polyol (b) should have a molecular weight greater than 150 g/mol.

The formaldehyde-free curable aqueous composition contains a polycarboxy (co)polymer. The polycarboxy (co)polymer must be sufficiently nonvolatile that it will substantially remain available for reaction with the polyol in the composition during heating and curing operations. The polycarboxy (co)polymer may be, for example, a polyester containing at least two carboxylic acid groups; alternatively, it may be an addition polymer or oligomer containing at least two copolymerized carboxylic acid-functional monomers. The polycarboxy (co)polymer is preferably an addition polymer formed from at least one ethylenically unsaturated monomer. In one embodiment of the invention, the curable copolymer composition is a solid composition such as, for example, a powder or a film. The solid composition may be obtained by various methods of drying, such as, for example spray drying, fluidized bed drying, freeze drying, and the like.

In a preferred embodiment, the curable copolymer composition is a curable aqueous composition. "Aqueous" as used herein includes water, and mixtures of water and water-miscible solvents. In this embodiment, the polycarboxy (co)polymer may be in the form of a solution of the addition polymer in an aqueous medium such as, for example, a polyacrylic acid homopolymer or an alkali-soluble resin which has been solubilized in a basic medium; in the form of an aqueous dispersion such as, for example, an emulsion-polymerized dispersion; or in the form of an aqueous suspension.

The practice of emulsion polymerization is discussed in detail in D. C. Blackley, *Emulsion Polymerization* (Wiley, 1975) and also in H. Warson, *The Applications of Synthetic Resin Emulsions*, Chapter 2 (Ernest Benn Ltd., London 1972).

The polycarboxy (co)polymer must contain at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid, α,β-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomer may include ethylenically-unsaturated nonionic acrylic monomers, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate; hydroxyalkyl(meth)acrylate monomers such as 2-hydroxyethyl methacrylate, 2-hydroxyethyl acrylate, 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate and 2-hydroxybutyl acrylate; phosphoalkyl (meth)acrylates such as phosphoethyl (meth)acrylate, phosphopropyl (meth)acrylate, and phosphobutyl (meth)-acrylate, phosphodialkyl (meth)acrylates; as well as phosphoalkyl crotonates, phosphoalkyl maleates, phosphoalkyl fumarates, phosphodialkyl crotonates, and allyl phosphate.

Other ethylenically-unsaturated nonionic monomers which may be incorporated into the polycarboxy (co)polymer include vinylaromatic compounds, such as styrene, α-methylstyrene, p-methylstyrene, ethylvinylbenzene, vinylnaphthalene, vinylxylenes, vinyltoluenes, and the like; vinyl acetate, vinyl butyrate and other vinyl esters; vinyl monomers such as vinyl alcohol, vinyl chloride, vinyl toluene, vinyl benzophenone, and vinylidene chloride.

Further ethylenically-unsaturated nonionic acrylic monomers include acrylamides and alkyl-substituted acrylamides, such as acrylamide, methacrylamide, N-tert-butylacrylamide and N-methyl(meth)acrylamide; hydroxyl-substituted acrylamides, such as methylol-acrylamide, and beta-hydroxyalkylamides; acrylonitrile or methacrylonitrile; and the like.

When the polycarboxy (co)polymer is in the form of a solution of the addition polymer in an aqueous medium such as, for example, a polyacrylic acid homopolymer or an alkali-soluble resin which has been solubilized in a basic medium, the weight average molecular weight may be from about 300 to about 10,000,000. Preferred is a molecular weight from about 1000 to about 250,000.

In one embodiment of the present invention, the polycarboxy addition (co)polymers may be oligomers or co-oligomers of ethylenically-unsaturated carboxylic acids prepared by free radical addition polymerization, having a number average molecular weight of from 300 to 1000.

In one preferred embodiment, the polycarboxy polymer or copolymer is a polyacrylic acid homopolymer (pAA) for which a weight average molecular weight of no greater than 10,000, is suitable, more preferably no greater than 5,000, even more preferably no greater than 3,000, and with 2,000-3,000 being advantageous.

When the addition polymer is an alkali-soluble resin having a carboxylic acid, anhydride, or salt thereof, content of from about 5% to about 30%, by weight based on the total weight of the addition polymer, a molecular weight from about 1,000 to about 100,000 is preferred (with from 1,000 to about 20,000 being more preferred), since higher molecular weight alkali-soluble resins lead to curable compositions exhibiting excessive viscosity.

In another preferred embodiment, more suitable for applications for which the end product requires greater flexibility, one or more acid-containing emulsion polymers are utilized as the polycarboxy (co)polymer, for which molecular weights of 1,000 to 10,000,000 can be used, preferably 10,000 to 5,000,000, and more preferably 250,000 to 1,000,000. Polycarboxy (co)polymer molecular weights reported herein, unless otherwise indicated, are weight average molecular weights, Mw, as measured by gel permeation chromatography (GPC) using polystyrene standards as is known in the art. However, number average molecular weights, Mn, may be considered to be more meaningful at low molecular weights for which Mw is about 1,000 or less. In such cases, GPC measurements can still be used, although polyacrylic acid standards may be more suitable for calibration purposes. For aqueous solutions, such as the homopolymer polyacrylic acid (pAA) mentioned above, the GPC standard is a polyacrylic acid standard, as is generally used in the art.

The formaldehyde-free curable aqueous composition of this invention may optionally contain a phosphorous-containing cure accelerator which may be a compound with a molecular weight less than about 1000 such as, for example, an alkali metal hypophosphite salt, hypophosphorous acid, an alkali metal phosphite, an alkali metal polyphosphate, an alkali metal dihydrogen phosphate, a polyphosphoric acid, and an alkyl phosphinic acid or it can be an oligomer or polymer bearing phosphorous-containing groups such as, for example, an addition polymer of acrylic and/or maleic acid formed in the presence of sodium hypophosphite (SHP), addition polymers such as, for example, the copolymer of the present invention prepared from ethylenically-unsaturated monomers in the presence of phosphorous salt chain transfer agents or terminators, and addition polymers containing acid-functional monomer residues such as, for example, copolymerized phosphoethyl methacrylate, and like phosphonic acid esters. Copolymerized vinyl sulfonic acid monomers, and their salts can function similarly. The phosphorous-containing species can be used at a level of from 0% to 40%, preferably from 0% to 20%, further preferably from 0% to 15%, more preferably from 0% to 10% by weight based on the combined weight of the polycarboxy (co)polymer and the polyol. We prefer a level of phosphorous-containing accelerator of from about 2.5% to about 10%, by weight based on the combined weight of polycarboxy (co)polymer and polyol.

Thus, a particularly advantageous embodiment provides a curable thermoset composition utilizing a polyacrylic acid homopolymer of 2,500 weight average molecular weight in combination with triglycerol, optionally with one or more other polyols, such that the ratio of carboxy groups to —OH groups is 1.0/0.5, and using 5% SHP as a phosphorous containing catalyst.

In addition, if a phosphorous-containing chain transfer agent is used to polymerize the polycarboxy (co)polymer employed in the curable composition of this invention, the phosphorous-terminated (co)polymer can act as a phosphorous-containing cure accelerator as defined herein. Specifically, the addition polymer may be formed in the presence of phosphorous-containing chain transfer agents such as, for example, hypophosphorous acid and its salts, as is disclosed in U.S. Pat. Nos. 5,077,361 and 5,294,686, which are hereby incorporated herein by reference, so as to incorporate the phosphorous-containing accelerator and the polycarboxy component in the same molecule. The polymerization reaction to prepare such a phosphorous-containing (co)polymer is otherwise similar to that used to prepare other polycarboxy (co)polymers, as described herein below.

The formaldehyde-free curable aqueous composition may be prepared by admixing the polycarboxy (co)polymer, the polyol, and, optionally, the phosphorous-containing accelerator using conventional mixing techniques. In another embodiment a carboxyl- or anhydride-containing addition (co)polymer and an hydroxy-functional monomer may be present in the same addition (co)polymer, which addition (co)polymer would contain both the carboxyl, anhydride, or salts thereof functionality and the hydroxyl functionality. In another embodiment the phosphorous-containing accelerator may be present in the polycarboxy addition (co)polymer, which addition (co)polymer may be mixed with the polyol (b). In yet another embodiment, the carboxyl- or anhydride-containing addition (co)polymer, the hydroxy-functional monomer, and the phosphorous-containing accelerator may be present in the same addition (co)polymer. Other embodiments will be apparent to one skilled in the art.

In a preferred embodiment of this invention, the curable binder composition contains a strong acid. "Strong acid" means a non-carboxylic acid having at least one pKa of no greater than 3. In this embodiment, the curable binder composition preferably contains from 0.01 to 0.2 equivalents of a strong acid, relative to the equivalents of total carboxylic acid, more preferably from 0.01 to 0.18 equivalents. "Total carboxylic acid" means the entire amount of the carboxylic acid present in the (co)polymer composition. The strong acid may be a mineral acid, such as, for example, sulfuric acid, or an organic acid, such as, for example a sulfonic acid. Mineral acids are preferred.

Preferably, the pH of the aqueous curable composition is less than 3.5, also preferably less than 2.5, which pH will depend, among other things, on the choice of polyol or adjuvants employed, and the strength and amount of any strong acid or base that may be added.

In one embodiment of the invention, the curable composition further contains at least one low molecular weight polybasic carboxylic acid, anhydride or salt thereof having a molecular weight of 1000 or less, preferably 500 or less, and most preferably 200 or less. "Polybasic" means having at least two reactive acid or anhydride functional groups (see, for example, *Hawley's Condensed Chemical Dictionary*, 14$^{th}$ Ed., 2002, John Wiley and Sons, Inc.). Examples of suitable low molecular weight polybasic carboxylic acids and anhydrides include, for example, maleic acid, maleic anhydride, fumaric acid, succinic acid, succinic anhydride, sebacic acid, azelaic acid, adipic acid, citric acid, glutaric acid, tartaric acid, itaconic acid, trimellitic acid, hemimellitic acid, trimesic acid, tricarballytic acid, 1,2,3,4-butanetetracarboxylic acid, pyromellitic acid, oligomers of carboxylic acid, and the like. Optionally, the low molecular weight polybasic carboxylic acid, anhydride or salt thereof may be mixed with the hydroxyl-containing compound, under reactive conditions, prior to mixing with the polycarboxy (co)polymer. As discussed above, in certain embodiments, the (co)polymer composition can include an accelerator. The accelerator may be present during this reaction, which can be an in-situ reaction, or alternatively, the accelerator may be added to the composition after completion of this in-situ reaction and prior to mixing with the polycarboxy (co)polymer.

The polycarboxy (co)polymer may be prepared by free radical addition polymerization. In the embodiment of the invention where the composition is in the form of a solid, the (co)polymer can be prepared, for example, in a hot tube, either in the absence of solvent or with low levels of solvent for reduced viscosity. In other embodiments of the invention, the (co)polymer can be prepared by solution polymerization, emulsion polymerization, or suspension polymerization techniques for polymerizing ethylenically-unsaturated monomers, which are well known in the art. When it is desired to use emulsion polymerization, anionic or nonionic surfactants, or mixtures thereof, can be used. For some applications, such as those requiring resistance to water sensitivity, the use of polymerizable surfactants (also known as reactive surfactants) can be advantageous; these surfactants are known in the art, as described, for example, in U.S. Patent Publication No. 2003/0149119 or U.S. Patent Publication No. 2001/0031826. The polymerization can be carried out by various means such as, for example, with all of the monomers added to the reaction kettle prior to beginning the polymerization reaction, with a portion of the ethylenically-unsaturated monomer in emulsified form present in the reaction kettle at the beginning of the polymerization reaction, or with a small particle size emulsion polymer seed present in the reaction kettle at the beginning of the polymerization reaction.

The polymerization reaction to prepare the polycarboxy (co)polymer composition can be initiated by various methods known in the art such as, for example, by using the thermal decomposition of an initiator and by using an oxidation-reduction reaction ("redox reaction") to generate free radicals to effect the polymerization. The polycarboxy (co)polymer composition can be prepared in water or in solvent/water mixtures such as, for example, i-propanol/water, tetrahydrofuran/water, and dioxane/water.

Chain transfer agents such as mercaptans, polymercaptans, and halogen compounds can be used in the polymerization mixture in order to moderate the molecular weight of the polycarboxy (co)polymer composition. Generally, from 0% to 10% by weight, based on the weight of the polymeric binder, of $C_4$-$C_{20}$ alkyl mercaptans, mercaptopropionic acid, or esters of mercaptopropionic acid, can be used. Similarly, as stated above, in another embodiment the polycarboxy (co)polymer composition can be formed in the presence of phosphorous-containing chain transfer agents such as, for example, hypophosphorous acid and its salts, so as to incorporate a phosphorous-containing species in the polymer backbone.

The carboxyl groups of the (co)polymer composition may be neutralized with a base. The base may be added before, during, or after polymerization of monomers to form the polycarboxy (co)polymer composition. The neutralization may at least partially occur prior to, or while treating a substrate.

In one embodiment of the invention, the carboxyl groups of the (co)polymer composition may be neutralized with a fixed base, meaning a base which is substantially non-volatile under the conditions of the treatment such as, for example, sodium hydroxide, potassium hydroxide, sodium carbonate, or t-butylammonium hydroxide. The fixed base must be sufficiently nonvolatile that it will substantially remain in the composition during heating and curing operations.

In a different embodiment of the invention, the carboxy groups may be neutralized with a volatile base, meaning a base which is substantially volatile under the conditions of treatment of the substrate with the copolymer composition. Suitable volatile bases for neutralization include, for example, ammonia or volatile lower alkyl amines. The volatile base can be used in addition to the fixed base. Fixed multivalent bases such as, for example, calcium carbonate can tend to destabilize an aqueous dispersion, if the polycarboxy (co)polymer composition is used in the form of an aqueous dispersion, but can be used in minor amount.

The formaldehyde-free curable aqueous composition of this invention is a substantially thermoplastic, or substantially uncrosslinked, composition when it is applied to the substrate, although low levels of deliberate or adventitious crosslinking may be present. However, when the polycarboxy (co)polymer is in the form of an aqueous dispersion or an aqueous suspension and low levels of precrosslinking or gel content are desired, low levels of multi-ethylenically-unsaturated monomers such as, for example, allyl methacrylate, diallyl phthalate, 1,2-ethylene glycol dimethacrylate, 1,4-butylene glycol dimethacrylate, 1,6-hexanedioldiacrylate, butadiene, and divinyl benzene and the like, can be used at a level of from 0.01% to 5%, by weight based on the weight of polycarboxy (co)polymer.

When the polycarboxy (co)polymer composition is in the form of an aqueous dispersion, the weight average particle diameter of the copolymer particles can be from 80 nanometers to 1000 nanometers, as measured using a Brookhaven BI-90 Particle Sizer (Brookhaven Instruments Corporation, Holtsville, N.Y., USA), which employs a light scattering technique. However, polymodal particle size distributions such as those disclosed in U.S. Pat. Nos. 4,384,056 and 4,539,361, hereby incorporated herein by reference, can be employed.

When the polycarboxy (co)polymer composition is in the form of an aqueous dispersion, the copolymer particles can be made up of two or more mutually incompatible (co)polymers. These mutually incompatible (co)polymers can be present in various morphological configurations such as, for example, core/shell particles, core/shell particles with shell phases incompletely encapsulating the core, core/shell particles with a multiplicity of cores, interpenetrating network particles, and the like.

In one embodiment of the present invention, a macromolecular organic compound having a hydrophobic cavity is present in the polymerization medium used to form the polycarboxy copolymer composition. Suitable techniques for using a macromolecular organic compound having a hydrophobic cavity are disclosed in, for example, U.S. Pat. No. 5,521,266. Macromolecular organic compounds having a hydrophobic cavity useful in the present invention include, for example, cyclodextrin or cyclodextrin derivatives; cyclic oligosaccharides having a hydrophobic cavity such as cycloinulohexose, cycloinuloheptose, or cycloinuloctose; calyxarenes; cavitands; or combinations thereof. Preferably, the macromolecular organic compound is β-cyclodextrin, more preferably methyl-β-cyclodextrin.

In one embodiment of the invention, the curable binder composition is blended with an emulsion polymer including, as polymerized units, at least one copolymerized ethylenically-unsaturated nonionic acrylic monomer. "Emulsion polymer" or "emulsion (co)polymer" means a (co)polymer dispersed in an aqueous medium that has been prepared by emulsion polymerization techniques known in the art as is discussed in detail in D. C. Blackley, *Emulsion Polymerization* (Wiley, 1975) and also in H. Warson, *The Applications of Synthetic Resin Emulsions*, Chapter 2 (Ernest Benn Ltd., London 1972). By "nonionic monomer" herein is meant that the copolymerized monomer residue does not bear any substantial ionic charge between pH=1-14. The emulsion polymer used in blending is separate and different from the polycarboxy (co)polymer of the binder of this invention in the case when the polycarboxy (co)polymer is also an emulsion, and may be used in blending with the curable binder composition of the invention. The emulsion polymer used in blending may be present in an amount of from 1% to 40%, preferably from 1% to 30%, more preferably from 1.5% to 20%, and still more preferably 5% to 15%, by weight based on the weight of the curable binder composition, on a solids basis.

The ethylenically-unsaturated nonionic acrylic monomers of the emulsion polymer used in blending may include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate; hydroxyalkyl(meth)acrylate monomers such as 2-hydroxyethyl methacrylate, 2-hydroxyethyl acrylate, 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate and 2-hydroxybutyl acrylate. Other ethylenically-unsaturated nonionic monomers which may be incorporated into the polymer include vinylaromatic compounds, such as styrene, α-methylstyrene, p-methylstyrene, ethylvinylbenzene, vinylnaphthalene, vinylxylenes, vinyltoluenes, and the like; vinyl acetate, vinyl butyrate and other vinyl esters; vinyl monomers such as vinyl alcohol, vinyl chloride, vinyl toluene, vinyl benzophenone, and vinylidene chloride.

Further ethylenically-unsaturated nonionic acrylic monomers include acrylamides and alkyl-substituted acrylamides, such as acrylamide, methacrylamide, N-tert-butylacrylamide and N-methyl(meth)acrylamide; hydroxyl-substituted acrylamides, such as methylol-acrylamide, and beta-hydroxy-alkylamides; as well as acrylonitrile and methacrylonitrile.

The emulsion polymer used in blending with the curable binder composition of this invention may contain one or more monoethylenically-unsaturated acid monomer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate.

The emulsion polymer used in blending with the curable binder composition of this invention may contain copolymerized multi-ethylenically-unsaturated monomers such as, for example, allyl methacrylate, diallyl phthalate, 1,4-butylene glycol dimethacrylate, 1,2-ethylene glycol dimethacrylate, 1,6-hexanediol diacrylate, butadiene, and divinyl benzene.

In a further embodiment of the invention, and also for applications for which enhanced waterproofing properties are desired of the curable composition, the emulsion polymer(s) used in blending with the curable binder composition of this invention is a predominately hydrophobic emulsion polymer including, as polymerized units, greater than 30%, preferably greater than 40%, more preferably greater than 50%, and even more preferably greater than 60%, by weight, based on the weight of the emulsion polymer solids, of an ethylenically-unsaturated acrylic monomer including an aliphatic alkyl group having five or more C atoms, the alkyl group including n-alkyl, s-alkyl, i-alkyl, and t-alkyl groups. This approach to waterproofing has been disclosed in U.S. Patent Publication No. 20050048212A1. Suitable ethylenically-unsaturated include ($C_5$-$C_{30}$) alkyl esters of (meth)acrylic acid, such as 2-ethylhexyl (meth)acrylate, lauryl (meth)acrylate, oleyl (meth)acrylate, stearyl (meth)acrylate; unsaturated vinyl esters of (meth)acrylic acid such as those derived from fatty acids and fatty alcohols; surfactant monomers including long chain alkoxy- or alkylphenoxy(polyalkylene oxide) (meth) acrylates, such as $C_{18}H_{37}$-(ethylene oxide)$_{20}$ methacrylate and $C_{12}H_{25}$-(ethylene oxide)$_{23}$ methacrylate; N-alkyl substituted (meth)acrylamides such as octyl acrylamide; and the like. The monomer can also contain functionality, such as amido, aldehyde, ureido, polyether and the like, but preferably does not contain an acid or hydroxy group. Emulsion polymers containing such monomers can be prepared by emulsion polymerization, preferably by the method for forming polymers of U.S. Pat. No. 5,521,266.

The predominately hydrophobic emulsion polymer can also include, as copolymerized units, from 0% to 10%, preferably from 0% to 5%, by wt based on the weight of the emulsion polymer solids, monomer bearing a carboxylic acid group, anhydride group, or salt thereof or hydroxyl-group, such as (meth)acrylic acid and hydroxyethyl(meth)acrylate. The emulsion polymer may be present in an amount of from 1% to 40%, preferably from 1% to 30%, more preferably from 1.5% to 20%, and still more preferably 5% to 15%, by weight based on the weight of the curable binder composition, on a solids basis.

The composition of this invention can contain, in addition, conventional treatment components such as, for example, emulsifiers; pigments; fillers or extenders; anti-migration aids; curing agents; coalescents; surfactants, particularly nonionic surfactants; spreading agents; mineral oil dust suppressing agents; biocides; plasticizers; organosilanes; anti-foaming agents such as dimethicones, silicone oils and ethoxylated nonionics; corrosion inhibitors, particularly corrosion inhibitors effective at pH<4 such as thioureas, oxalates, and chromates; colorants; antistatic agents; lubricants; waxes; anti-oxidants; coupling agents such as silanes, particularly Silquest™ A-187 (manufactured by GE Silicones—OSi Specialties, located in Wilton, Conn., USA); Wetlink Silanes from GE (e.g Wetlink 78), and Dynasylan™ silanes from Degussa particularly, epoxy silanes such as, but not limited to, Dynasylan™ GLYMO and GLYEO; and oligomeric silanes such as HYDROSIL™. Also, polymers not of the present invention; and waterproofing agents such as silicones and emulsion polymers, particularly hydrophobic emulsion polymers containing, as copolymerized units, greater than 30% by weight, based on the weight of the emulsion polymer solids, ethylenically-unsaturated acrylic monomer containing a C5 or greater alkyl group.

The composition of this invention is preferably formaldehyde-free. "Formaldehyde-free" means that the composition is substantially free from formaldehyde, nor does it liberate substantial formaldehyde as a result of drying and/or curing. To minimize the formaldehyde content of the (co)polymer composition it is preferred, when preparing a polymer of the present invention, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of a substrate. Likewise, it is preferable that any formulation additives be similarly formaldehyde free. "Substantially free from formaldehyde" means that when low levels of formaldehyde are acceptable in the waterborne composition or when compelling reasons exist for using adjuncts which generate or emit formaldehyde, substantially formaldehyde-free waterborne compositions can be used.

The composition of this invention may be used for treating various substrates. Such treatments can be commonly described as, for example, coating, sizing, saturating, bonding, combinations thereof, and the like. Typical substrates include wood, including, for example, solid wood, wood particles, fibers, chips, flour, pulp, and flakes; metal; plastic; fibers such as polyester, glass fibers; woven and non-woven fabrics; and the like and their composite fibers. The (co) polymer composition can be applied to a substrate by conventional techniques such as, for example, air or airless spraying, padding, saturating, roll coating, foam coating, curtain coating, beater deposition, coagulation, or the like.

In one embodiment of this invention, the composition can be used as a binder for heat-resistant non-woven fabrics such as, for example, non-wovens which contain heat-resistant fibers such as, for example, aramid fibers, ceramic fibers, metal fibers, carbon fibers, polyimide fibers, certain polyester fibers, rayon fibers, rock wool, and glass fibers. "Heat-resistant fibers" mean fibers which are substantially unaffected by exposure to temperatures above 125° C. Heat-resistant non-wovens can also contain fibers which are not in themselves heat-resistant such as, for example, certain polyester fibers, rayon fibers, nylon fibers, and super-absorbent fibers, in so far as they do not materially adversely affect the performance of the substrate.

As discussed above, non-woven fabrics incorporating a (co)polymer composition should substantially retain the properties contributed by the cured aqueous composition such as, for example, tensile strength, and not substantially detract from essential non-woven fabric characteristics. The cured composition should not be too rigid or brittle, or become sticky under processing conditions.

The curable aqueous (co)polymer composition, after it is applied to a substrate, is heated to effect drying and curing. The duration and temperature of heating will affect the rate of drying, processability, handleability; and property development of the treated substrate. Heat treatment at from 120° C. to 400° C. for a period of time between from 3 seconds to 15 minutes can be carried out; treatment at from 175° C. to 225° C. is preferred. "Curing" means a chemical or morphological change which is sufficient to alter the properties of the (co)polymer such as, for example, via covalent chemical reaction, ionic interaction or clustering, improved adhesion to the substrate, phase transformation or inversion, hydrogen bonding, and the like. The drying and curing functions can be performed in two or more distinct steps, if desired. For example, the composition can be first heated at a temperature and for a time sufficient to substantially dry but not to substantially cure the composition, and then heated for a second time at a higher temperature and/or for a longer period of time to effect curing. Such a procedure, referred to as "B-staging," can be used to provide binder-treated nonwoven, for example, in roll form, which can at a later stage be cured, with or without forming or molding into a particular configuration, concurrent with the curing process.

The heat-resistant non-wovens can be used for applications such as, for example, insulation batts or rolls, as reinforcing mat for roofing or flooring applications, as roving, as microglass-based substrate for printed circuit boards or battery separators, as filter stock (e.g. for air duct filters), as tape stock, and as reinforcement scrim in cementitious and non-cementitious coatings for masonry, in ceiling tiles, cellulosic roofing tiles, window treatments, wall coverings, molded parts, for curly pulp modification, for powder coating, and the like.

The non yellowing flexible binders of the invention are also useful for bonding wood chips, abrasive matts, decorative laminate paper, laminating adhesives, filtration paper, or cotton rag bonding for automotive sound insulation.

EXAMPLES

Example 1

Synthesis of Polycarboxy Solution Polymer

The polymer produced with this procedure was used in the examples in Table 1 below. To a three liter four-neck flask equipped with a mechanical stirrer, a condenser, a nitrogen sweep, a thermometer and inlets for the gradual additions of monomer, initiator and sodium hypophosphite solutions, was added 710 grams of deionized water. A chain regulator stock solution was prepared by dissolving 1250 grams of sodium hypophosphite monohydrate in 1528 grams of deionized water. A total of 243.2 grams was removed from the stock solution and half (121.6) of this solution was added to the water charge and heated to 93° C. The remaining half of the chain regulator solution was used as co-feed solution. A monomer charge of 1216 grams of glacial acrylic acid was prepared. An initiator solution was prepared by dissolving 12.16 grams of sodium persulfate in 30.7 grams of DI water.

The acrylic acid, sodium persulfate and sodium hypophosphite (SHP) charges were added linearly and separately over two hours to the stirring water charge. Temperature was maintained at 93°±1° C.

The resultant polymer solution was allowed to cool to room temperature and diluted with 274 grams of deionized water. The solution had a solids content of 52.71%, pH of 3.2, viscosity of 210 centipoises (measured on a Brookfield LVF viscometer, #4 spindle at 100 rpm) and residual monomer content of less than 0.01%. The weight average (Mw) molecular weight by gel permeation chromatography (GPC, using a polyacrylic acid standard for calibration) was determined to be 2456, or, approximately 2500.

Example 2

Aqueous Curable Thermoset Compositions

Polycarboxy Solution Polymer+Multifunctional Polyols

A series of aqueous curable thermoset compositions were prepared using the polyacrylic acid polymer (pAA) of Example 1 along with each of the following multifunctional polyols:

Amine-Containing Polyols
Diethanolamine, functionality 2, (used in Comparative Example 1A)
Bis[N,N,-di(β-hydroxyethyl)]adipamide, HEA (used in Comparative Example 2A)
Amine-Free Polyols
Glycerol, functionality 3, (used in Comparative Example 3A)
Sorbitol, functionality 6, (used in Comparative Example 4A)
Pentaerythritol, functionality 4, (used in Comparative Example 5A)
Diglycerol, functionality 4, (used in inventive Example 1A)
Triglycerol, functionality 5, (used in inventive Example 2A)
Ethoxylated (5 EO) pentaerythritol, functionality 4, (used in inventive Example 3A)
Ethoxylated (4 EO) dipentaerythritol, functionality 6, (used in inventive Example 4A)
Ditrimethylolpropane, functionality 4, (used in inventive Example 5A)

The COOH/OH ratio of these curable thermosets was 1.0/0.5, except for the sample utilizing pentaerythritol for which the maximum level that could be dissolved in the system was used (1.0/0.25). Sodium hypophosphite (SHP) was used as a catalyst.

The aqueous curable thermoset compositions were prepared as follows: To 145.0 grams of polyacrylic acid of Example 1 (diluted to 50% solids; Mw=2500) was added 22.7 grams of glycerol (97% solids), 8.1 grams of sodium hypophosphite solution (50% solids) and 24.2 grams of water. The pH of the mixture was 2.6 and the viscosity was 96.5 centipoises (measured on a Brookfield LVF viscometer, #4 spindle at 100 rpm). The active ingredients (components other than water) were 50.4%.

Prepared similarly, the compositions of the aqueous curable thermosets are presented in Table 1, below.

TABLE 1

Composition of the aqueous curable thermosets (grams):

| Thermoset Composition | Crosslinker | pAA (50% Solid) | Cross-linker | SHP (50% Solid) | Water |
|---|---|---|---|---|---|
| Comp. Ex. 1A | Diethanolamine (98% active) | 125.0 | 21.6 | 7.0 | 34.6[1] |
| Comp. Ex. 2A | HEA[2] (100% solid) | 124.8 | 33.9 | 7.0 | 34.3 |
| Comp. Ex. 3A | Glycerol (97% active) | 145.0 | 22.7 | 8.1 | 24.2 |
| Comp. Ex. 4A | Sorbitol (100% solid) | 155.6 | 16.5 | 8.7 | 19.2 |
| Comp. Ex. 5A | Pentaerythritol (100% solid) | 124.5 | 8.0 | 7.0 | 10.5 |
| Example 1A | Diglycerol (100% active) | 148.6 | 20.3 | 8.2 | 22.8 |
| Example 2A | Triglycerol (100% active) | 142.5 | 23.4 | 8.0 | 26.1 |
| Example 3A | Ethoxylated (5 EO) Pentaerythritol (100% active) | 112.9 | 39.5 | 6.3 | 41.3 |
| Example 4A | Ethoxylated (4 EO) Dipentaerythritol (100% active) | 111.3 | 40.0 | 6.2 | 42.5 |
| Example 5A | Ditrimethylolpropane (100% s.) | 142.4 | 23.4 | 7.9 | 26.3 |

[1]Also sulfuric acid (95%), 11.7 g, post-added to neutralize to pH 3.0.
[2]HEA is Bis[N,N-di(β-hydroxyethyl)]adipamide

Example 3

Color Measurements of Cured Thermoset Compositions

Color measurements were made in order to assess the extent of coloring that occurs upon heating for a period of 30 minutes at 250° C. The thermoset compositions were diluted to 20% solids and the samples were prepared by applying the dilute composition onto the GFA glass paper to give a dry weight of 40%+/−2% by weight binder add-on (dry binder weight as a percentage of filter paper weight) on the GFA paper. The GFA paper can be obtained from Whatman (Whatman International Ltd., Maidstone, England). The measurements were made using a portable spectrophotometer (spectro-guide from BYK-Gardner, Columbia, Md., USA) with a D65 illuminant (daylight) and an observer at 10°, following a procedure that is well known throughout the coatings industry. See, for example, ASTM E1164. The inventive thermosets prepared utilizing the polyols of structure I were compared with thermoset compositions comprising an amine-containing polyol, the latter thermosets included a commercial thermoset composition (see below) which uses triethanolamine (TEOA) as the crosslinker, Table 2. The b value represents the yellowing color. The delta b value (b for sample on the paper−b for the paper) represents the yellowing of the composition.

TABLE 2

Color measurements for cured thermoset compositions

| Thermoset Composition | | Color Measurements | | | |
|---|---|---|---|---|---|
| | | L | a | b | delta b |
| (Control) | GFA paper | 98.26 | 0.31 | 0.21 | |
| Comp. Ex. A | Acrodur ™ 950 L (TEOA) | 82.40 | 4.96 | 26.33 | 26.12 |
| Comp. Ex. 1A | Thermoset Diethanolamine | 82.33 | 4.44 | 21.75 | 21.54 |
| Comp. Ex. 2A | Thermoset HEA | 73.85 | 8.16 | 28.33 | 28.12 |
| Example 1A | Thermoset Diglycerol | 94.23 | 0.36 | 7.70 | 7.49 |
| Example 2A | Thermoset Triglycerol | 93.12 | 0.27 | 11.57 | 11.36 |
| Example 3A | Thermoset Ethoxylated PER (5EO) | 89.33 | 1.76 | 17.27 | 17.06 |

TEOA is triethanolamine; HEA is Bis[N,N-di(β-hydroxyethyl)]adipamide
Acrodur ™ 950L is a commercial thermoset product supplied by BASF AG, Ludwigshafen, Germany.
Ethoxylated PER is ethoxylated pentaerythritol
The color measurements are sometimes referred to as "L, a, b measurement" because the parameters recorded are L (lightness), a (+red/−green) and b (+yellow/−blue).

As the delta b value represents the yellowing of the composition, it can be seen that the inventive samples are less yellow than those of the current commercial products that utilize amine crosslinkers.

Example 4

Evaluation of Tensile Strength of Cured Thermoset Compositions

In this example, the strength of the resulting cured thermoset polymer as a function of the component multifunctional polyol was explored. The extent of effective crosslinking can be ascertained by comparing the wet tensile strength with the dry tensile strength.

The aqueous curable compositions of Table 1 were evaluated for wet and dry tensile strength as follows. Glass microfiber filter paper sheets (20.3×25.4 cm, Cat No. 1820 866, Whatman International Ltd., Maidstone, England) were dipped in each sample binder composition and run through a roll padder with roll pressures of 45 psi. The coated sheets were then dried by heating at 90° C. for 5 minutes in a Mathis oven. Post drying weight was determined to calculate binder add-on (40%+/−2% by weight binder add-on, see above). Dried sheets were then cured in a Mathis oven at a temperature of 200° C. for 3 minutes.

The cured sheets were cut into 1 inch (cross machine direction) by 4 inch (machine direction) strips and tested for tensile strength in the machine direction in a Zwick 1120 tensile tester (Zwick Roell AG, Ulm, Germany). The fixture gap was 1 inch and the pull rate was 1 inch/minute. Strips were tested either "as is" (dry tensile) or immediately after 15 minutes in an autoclave at 112° C. and 1.5 bar (wet tensile). Tensile strengths were recorded as the peak force measured during parting (Table 3). Data reported are averages of 7 test strips for each binder composition tested.

TABLE 3

Tensile strength for cured thermoset compositions

| Thermoset Composition | Crosslinker | Tensile Strength (Mpa) | |
|---|---|---|---|
| | | Dry | Wet |
| Comp. Ex. 3A | Glycerol | 34.6 | 3.1 |
| Comp. Ex. 4A | Sorbitol | 31.4 | 4.9 |
| Comp. Ex. 5A | Pentaerythritol | 34.3 | 8.7 |
| Example 1A | Diglycerol | 28.0 | 18.4 |
| Example 2A | Triglycerol | 30.1 | 20.9 |
| Example 3A | Ethoxylated (5 EO) Pentaerythritol | 32.4 | 23.0 |
| Example 4A | Ethoxylated (4 EO) Dipentaerythritol | 30.7 | 17.1 |
| Example 5A | Ditrimethylolpropane | 29.5 | 22.9 |

A wet tensile strength of a curable composition-treated glass microfiber filter paper which is a substantial fraction of the dry tensile strength of a similarly treated glass microfiber filter paper indicates that a composition has cured, and that useful high temperature performance of the cured aqueous composition-treated glass microfiber filter paper results. The wet tensile strengths of thermosets containing the polyols (b), as described by structure I herein, are considerably better (retain a higher percentage of the dry tensile strength) than the wet tensile strength of thermosets containing the comparative polyols: glycerol, sorbitol or pentaerythritol.

Example 5

Emulsion Polymer Synthesis of Sample MFM-4662

The emulsion polymer sample MFM-4662 was prepared using the following procedure. A 3-liter round-bottom flask equipped with a paddle stirrer, thermocouple, nitrogen inlet, and reflux condenser was charged with a mixture of 793 grams of hot deionized water, 1.95 grams of ammonium persulfate, and 91.7 grams of a 100 nm latex seed with a solids content of 45%. A monomer emulsion was prepared according to the following recipe: 245.7 grams deionized water, 6.5 grams of sodium lauryl ether sulfate surfactant (30%), 407.9 grams of butyl acrylate, 255.1 grams of styrene, 117.0 grams of acrylic acid, and 7.8 grams of n-dodecyl mercaptan. While maintaining a reaction temperature of 88° C., the monomer emulsion and a separate solution of 1.95 grams of ammonium persulfate in 102 grams of deionized water were gradually added over 3 hours. After this addition was complete, the reaction mixture was held at 88° C. for 20 minutes then cooled to 70° C. A solution of 7.8 milligrams of ferrous sulfate heptahydrate in 5.2 grams deionized water was added to the reaction mixture. A solution of 2.55 grams of aqueous tert-butylhydroperoxide (70%) diluted with 19.5 grams deionized water and a solution of 1.82 grams of isoascorbic acid in 19.5 grams of deionized water were gradually added to the reaction mixture over 15 minutes. The reaction mixture was held at 70° C. for an additional 15 minutes then cooled. The resulting latex had a solids content of roughly 39.5%, pH of 2.43, weight average particle size (particle diameter by BI-90 Particle Sizer) of 306 nm, and a weight average molecular weight (determined by gel permeation chromatography) of 405,000.

Example 6

Aqueous Curable Thermoset Compositions

Emulsion Polymers with Carboxy Acid+Multifunctional Polyols

Aqueous curable thermoset compositions were prepared in a manner analogous to Example 2, except that the carboxy polymer species was an emulsion polymer with carboxylic acid functionality. The following emulsion polymers were used:

| Primal ™ I-1955 SF | 80 EA/20 MAA |
|---|---|
| Acrysol ™ ASE-60 ER | 60.3 EA/39.6 MAA |
| MFM-4662 | 52.3 BA/32.7 Sty/15 AA |

(EA is ethyl acrylate; BA is butyl acrylate; Sty is styrene; MAA is methacrylic acid; AA is acrylic acid).

MFM-4662 emulsion was prepared as described in Example 5 above. Primal™ I-1955 SF and Acrysol™ ASE-60 ER are both commercially available (Rohm and Haas Company, Philadelphia, USA). The aqueous curable thermoset compositions were formulated as shown below in Table 4. The COOH/OH ratio was 1.0/0.5

TABLE 4

Aqueous Curable Thermoset Formulations (grams):

| Thermoset Composition | Emulsion | Crosslinker | Emulsion | Crosslinker | Water |
|---|---|---|---|---|---|
| Comp. Ex. 1B | Primal I-1955 | Glycerol | 142.3 | 3.1 | 4.6 |
| Example 1B | Primal I-1955 | Diglycerol | 143.2 | 2.8 | 4.0 |
| Comp. Ex. 2B | ASE-60 ER | Glycerol | 145.6 | 4.5 | 0 |
| Example 2B | ASE-60 ER | Diglycerol | 146.1 | 3.9 | 0 |
| Comp. Ex. 3B | MFM-4662 | Glycerol | 143.2 | 2.8 | 4.0 |
| Example 3B | MFM-4662 | Diglycerol | 143.8 | 2.5 | 3.7 |
| Example 4B | MFM-4662 | Propoxylated pentaerythritol (5 PO) | 135.1 | 5.9 | 8.9 |

Example 7

Effect of Crosslinking

Figure 2:
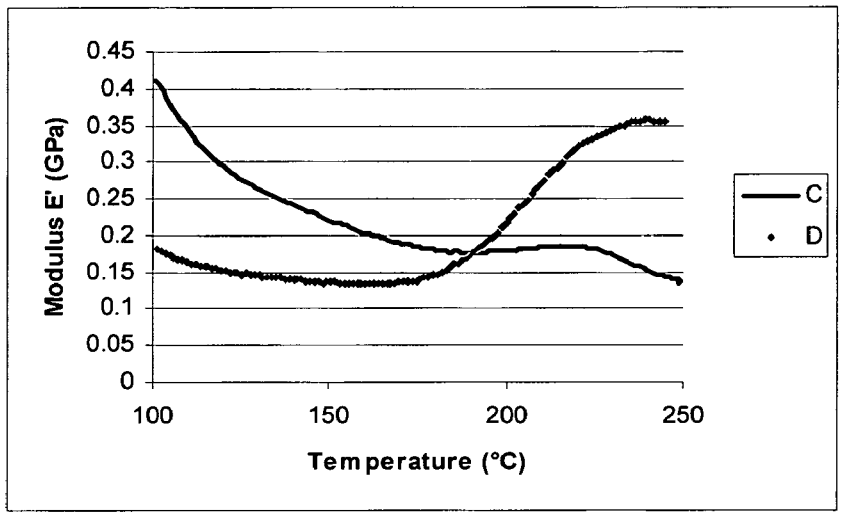
FIG. 2 depicts the Dynamic Mechanical Analysis (DMA) Modulus E', in GPa, vs. Temperature (° C.) for another embodiment of the present invention (Example 2B in curve D) and for a comparative embodiment (Comparative Example 2B in curve C).
Figure 3:
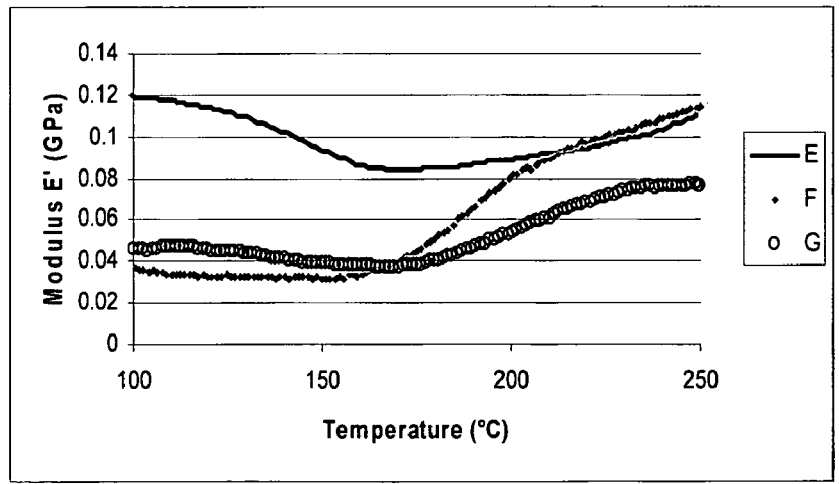
FIG. 3 depicts the Dynamic Mechanical Analysis (DMA) Modulus E', in GPa, vs. Temperature (° C.) for yet another embodiment of the present invention (Example 4B in curve G) and for a comparative embodiment (Comparative Example 3B in curve E).

The acid containing emulsion polymers were crosslinked with high functionality polyols:

Each sample from Table 4 above was diluted to 20% solid content, applied on GF-A glass paper and dried in the oven (90° C. for 10 minutes). Then the extent of crosslinking was evaluated by Dynamic Mechanical Analysis (DMA) (from 100° C. to 250° C., increments of 3° C./min) and plotted as shown in FIGS. 1-3. The crosslinking reaction (and thus curing) occurs during the rise in temperature, which is manifested by a significant increase in the dynamic storage tensile modulus, E' (see, for example, L. E. Nielsen and R. F. Landel, *Mechanical Properties of polymers and Composites,* 2nd edn., Marcel Dekker, 1994). Thus, the DMA plots of Modulus, E' (GPa) vs. Temperature (° C.) showed a marked upward slope starting at ~200° C., moving to a new maximum at ~240-250° C. for inventive samples 1B, 2B, 3B and 4B (curves B, D, F, and G, respectively; see FIGS. 1-3 and figure legend given in Table 5). The comparative compositions, Comp. 1B, Comp. 2B, and Comp. 3B (curves A, C, and E, respectively; FIGS. 1-3 and Table 5) showed no significant change in modulus and therefore exhibited no meaningful crosslinking.

The change in modulus upon heating can be summarized by the ratio of the modulus at the maximum (temperature ~230-250° C.) to the modulus at the minimum (temperature ~170-180° C.), E'max/E' min, Table 5.

TABLE 5

Extent of Crosslinking - DMA Results

| Figure Legend | Thermoset Composition | E'max/E'min |
|---|---|---|
| A | Comp. Ex. 1B | 1.3 |
| B | Example 1B | 3.8 |
| C | Comp. Ex. 2B | 1.1 |
| D | Example 2B | 2.7 |
| E | Comp. Ex. 3B | 1.3 |
| F | Example 3B | 3.8 |
| G | Example 4B | 2.1 |

It can be seen that the modulus increase is significantly greater for the inventive polyol crosslinked compositions (Examples 1B, 2B, 3B and 4B) than the comparative glycerol compositions.

Example 8

Measurement of Total Solids By Weight

When measuring total solids by weight, the method of ASTM D-2369 was followed.
Procedure:
1. Weigh aluminum dish to the 4th decimal place. Record this weight.
2. Weigh out appropriately 0.5 grams of sample and record the weight of the dish and sample to the 4th decimal place. Note that the sample should be distributed over the dish surface: a few drops of water can be used to aid in distributing the sample. Determination should be done in duplicate. Place the sample in a 150° C. oven for 30 minutes.
3. Remove the sample from the oven wearing leather gloves or with tongs and allow to cool to room temperature in a constant temperature and constant humidity room (25+/− 3° C.; 50+/−5% relative humidity) for approximately 2 minutes.
4. Weigh and record the aluminum dish and polymer to the 4th decimal place.
5. Use the equations below to determine the percent solids (% Solids):
Before Drying: (weight of dish and wet sample)−(weight of dish)=(weight of wet sample)
After Drying: (weight of dish and polymer)−(weight of dish)= (weight of polymer)
Then: % Solids=100×(weight of polymer)/(weight of wet sample)

We claim:
1. A curable aqueous composition comprising
   (a) at least one polycarboxy (co)polymer comprising at least two carboxylic acid groups, anhydride groups, or salts thereof prepared by solution or emulsion polymerization;
   (b) at least one polyol selected from the group consisting of diglycerol, triglycerol, tetraglycerol, pentaglycerol, hexaglycerol, ditrimethylolpropane, 1 to 15-ethoxylated pentaerythritol, 1 to 15-propoxylated ditrimethylolpropane, 1 to 15-ethoxylated ditrimethylolpropane, 1-15-ethoxylated dipentaerythritol, and mixtures thereof; and
   wherein the ratio of the number of equivalents of said carboxylic acid groups, anhydride groups, or salts thereof to the number of equivalents of said hydroxyl groups is from 1/0.01 to 1/3.
2. The curable aqueous composition of claim 1 wherein the polycarboxy (co)polymer (a) is an addition polymer or copolymer comprising at least one (co)polymerized ethylenically unsaturated carboxylic acid-containing monomer.
3. The curable aqueous composition of claim 1 further comprising one or more polyols selected from the group consisting of glycerol, ethyleneglycol, diethyleneglycol, triethyleneglycol, hexanediol, trimethylolpropane, sorbitol, sucrose, and glucose.
4. The curable aqueous composition of claim 1 further comprising a phosphorous-containing accelerator.
5. The curable aqueous composition as claimed in claim 1, wherein the polycarboxy (co)polymer (a) comprises an emulsion copolymer.
6. A method for treating substrates comprising:
   forming a curable aqueous composition comprising admixing with water and one or more water-miscible solvent
   (a) at least one polycarboxy (co)polymer comprising at least two carboxylic acid groups, anhydride groups, or salts thereof prepared by solution or emulsion polymerization;
   (b) at least one polyol selected from the group consisting of diglycerol, triglycerol, tetraglycerol, pentaglycerol, hexaglycerol, ditrimethylolpropane, 1 to 15-ethoxylated pentaerythritol, 1 to 15-propoxylated ditrimethylolpropane, 1 to 15-ethoxylated ditrimethylolpropane, 1-15-ethoxylated dipentaerythritol, and mixtures thereof; and
   wherein the ratio of the number of equivalents of said carboxylic acid groups, anhydride groups, or salts thereof to the number of equivalents of said hydroxyl groups is from 1/0.01 to 1/3;
   contacting said substrate with said curable aqueous composition or, alternatively, applying said curable aqueous composition to said substrate; and
   heating said curable aqueous composition at a temperature of from 100° C. to 400° C.
7. A fibrous article, non-woven article or composite prepared by the method as claimed in claim 6.

* * * * *